March 27, 1962 W. BLOCKER ET AL 3,027,087
POLYNOMIAL MULTIPLIER COMPUTER
Filed Dec. 15, 1955 4 Sheets-Sheet 1

*INVENTORS*
W. BLOCKER
J. P. GREENING
BY *Hudson & Young*
ATTORNEYS

INVENTORS
W. BLOCKER
J. P. GREENING
BY Hudson & Young
ATTORNEYS

March 27, 1962 W. BLOCKER ET AL 3,027,087
POLYNOMIAL MULTIPLIER COMPUTER
Filed Dec. 15, 1955 4 Sheets-Sheet 4

*INVENTORS*
W. BLOCKER
J. P. GREENING
BY *Hudson & Young*
ATTORNEYS 3,027,087
POLYNOMIAL MULTIPLIER COMPUTER
Wade Blocker and John P. Greening, Bartlesville, Okla., assignors to Phillips Petroleum Company, a corporation of Delaware
Filed Dec. 15, 1955, Ser. No. 553,318
12 Claims. (Cl. 235—194)

This invention relates to apparatus for transforming seismic signals. In another aspect it relates to apparatus for multiplying algebraic polynomials.

In geophysical prospecting, valuable information can often be obtained concerning subsurface formations by means of seismic surveys. A plurality of vibration responsive devices (seismometers) is positioned at or near the surface of the earth in a predetermined geometic array and an explosive charge is detonated at a region spaced therefrom. Vibrations emitted from the explosive charge travel downwardly into the earth and are reflected from various formations back to the vibration responsive elements. These elements are connected to suitable recording means. The seismic signals thus recorded generally are complex waves having numerous components. If the individual reflections are spaced a considerable distance apart, the reflected wave forms can often be detected in the recorded signals. However, in actual practice the recorded reflections normally are spaced so closely together that the reflection patterns from a number of discontinuities are superimposed to form a wave of complex character. Furthermore, the interpretation of these signals may be complicated by the presence of interfering waves.

In accordance with one aspect of the present invention, apparatus is provided for transforming seismic signals. This apparatus multiplies the output signal of a seismometer by a selected wave form representing a reflected signal from a subterranean formation. The seismometer output is multiplied continuously by this selected wave form to provide a cross-correlation between the two signals. When the selected wave form is most nearly superimposed on the counterpart signal in the seismometer output the resulting product exhibits a maximum. By this procedure it is possible to identify a reflected wave pattern in the presence of random noise vibrations. The apparatus provided to perform this correlation comprises a plurality of electrical signal storage means which can be in the form of electrical condensers. Switching means are provided to apply increments of the seismometer signal successively to each of the signal storage means. Voltage multiplying means, which can be in the form of potentiometers, are associated with the signal storage means to multiply the stored signal by a selected factor. The outputs of the multiplying means are summed and applied to a recording instrument.

The apparatus of this invention can also be employed to advantage to multiply one algebraic polynomial by another. The settings of the multiplying means are established in accordance with the coefficients of the first of the polynomials to be multiplied. A signal generator is employed to provide an electrical signal which varies in amplitude in accordance with the coefficients of the second of the polynomials. The output of the signal generator is applied to the first of the storage means in the same manner as is the output signal of the seismometer when the apparatus is employed to transform seismic signals.

Accordingly, it is an object of this invention to provide apparatus for transforming seismic signals to identify selected wave patterns.

Another object is to provide apparatus for interpreting seismic signals by means of a cross-correlation function.

A further object is to provide apparatus to multiply one algebraic polynomial by another.

Other objects, advantages and features of the invention should become apparent from the following detailed description, taken in conjunction with the accompanying drawing, in which.

Figure 1:
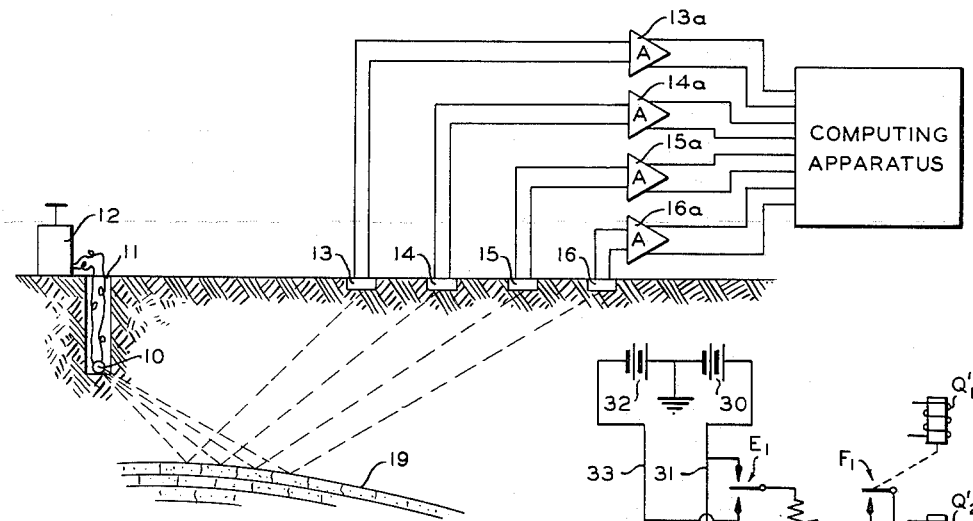
FIGURE 1 is a schematic representation of a seismic exploration system.

Referring now to the drawing in detail and to FIGURE 1 in particular, there is shown a seismic exploration system wherein an explosive charge 10 is positioned within a shot hole 11 and electrically connected to a detonator 12 positioned at the surface. Detonation of explosive charge 10 results in vibrations being transmitted outwardly therefrom in all directions. A plurality of vibration responsive seismometers 13, 14, 15 and 16 is positioned at or near the surface of the earth in a predetermined geometric array with respect to shot hole 11. Vibrational waves travel downwardly from explosive charge 10 and are reflected upwardly from a bed such as 19 to the several illustrated seismometers. It should be evident from an inspection of FIGURE 1 that the reflected waves arrive at the four seismometers at slightly different times. Seismometer 13 is energized first and there is a short time delay between the subsequent arrivals of the reflected waves at seismometers 14, 15 and 16. The difference in time between the arrivals of the signals at the several seismometers is due to differences in the length of paths traveled by the reflected waves. The time of arrival of a reflected wave is, therefore, a definite function of the depth of bed 19. By measuring the times of arrival of the reflected signals at the different seismometers, the depth and dip of bed 19 can be determined if the velocities of the seismic waves in the formations between bed 19 and the surface of the earth are known.

Figure 2A:
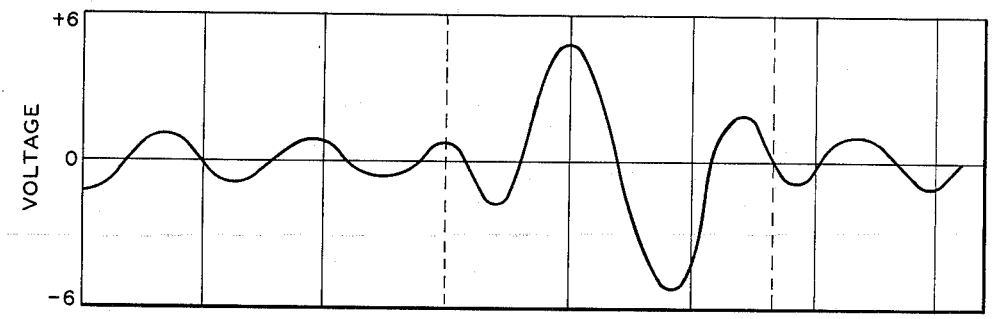
FIGURES 2a and 2b are graphical representations of the types of signals received by the seismometer in FIGURE 1.

In order to determine the times of arrival of the reflected waves at the several seismometers it is common practice to amplify and record the vibrations received by the seismometers. By recording the several vibration paths side by side on a common recording medium it is sometimes possible to determine the times of arrival of the reflected waves by direct observation of the recorded traces. In FIGURE 2a there is illustrated a somewhat ideal record of such recorded vibrations at a single seismometer. The magnitude of the voltage induced in the seismometer by the reflected wave incident thereon is plotted as a function of time. The vibration pattern illustrated between the time intervals $t_{15}$ and $t_{28}$ represents a wave reflected from bed 19, for example.

Figure 2B:
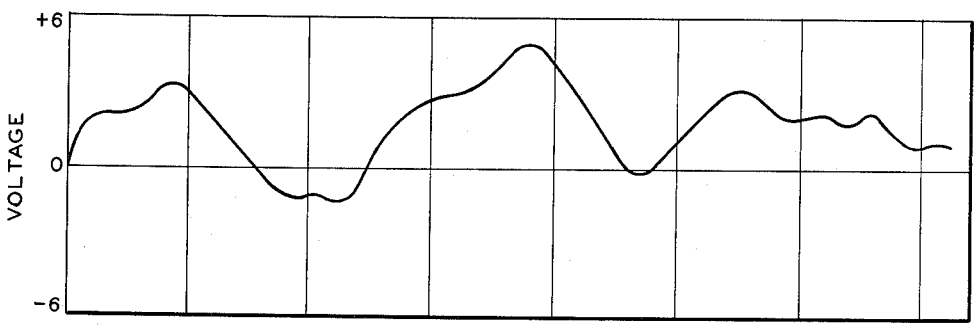

As is well known, surface waves, refracted waves and other more or less random waves are also generated by the detonation of explosive charge 10. In actual practice the problem of identifying a reflected wave in the recorded signal is complicated by the fact that these stray vibrations of varying amplitude and frequency are received at the seismometer as well as the desired reflection. In FIGURE 2b there is illustrated a curve which more closely approximates the vibration actually received by one of the seismometers. However, even the curve of FIGURE 2b is idealized to a certain extent. The presence of these random vibrations obviously complicates the problem of identifying the reflected wave to determine the exact time of arrival.

The computing mechanism of the present invention is provided to identify reflected signals in the presence of random noise vibrations. The outputs of seismometers 13, 14, 15 and 16 are amplified by respective amplifiers 13a, 14a, 15a and 16a and applied to the computing apparatus of this invention. This apparatus is illustrated schematically in FIGURE 3. The output terminals of seismometer amplifier 14a, for example, are connected to a terminal 21 and to ground, respectively.

Terminal 21 is connected to switch arms $S_1$, $S_2$, $S_3$ ... $S_n$ which engage respective contacts $T_1$, $T_2$, $T_3$ ... $T_n$ when actuated. Contacts $T_1$, $T_2$, $T_3$ ... $T_n$ are connected to the first terminals of respective capacitors $C_1$, $C_2$, $C_3$ ... $C_n$ and to the input terminals of respective amplifiers $A_1$, $A_2$, $A_3$ ... $A_n$. The second terminals of capacitors $C_1$, $C_2$, $C_3$ ... $C_n$ are connected to ground. The output terminals of amplifiers $A_1$, $A_2$, $A_3$ ... $A_n$ are connected to respective leads $L_1$, $L_2$, $L_3$ ... $L_n$. Contacts $M_{11}$, $M_{12}$, $M_{13}$ ... $M_{1n}$ are connected to lead $L_1$ to be engaged by respective switch arms $N_{11}$, $N_{12}$, $N_{13}$ ... $N_{1n}$. Contacts $M_{21}$, $M_{22}$, $M_{23}$ ... $M_{2n}$ are connected to lead $L_2$ to be engaged by respective switch arms $N_{21}$, $N_{22}$, $N_{23}$ ... $N_{2n}$. Contacts $M_{31}$, $M_{32}$, $M_{33}$ ... $M_{3n}$ are connected to lead $L_3$ to be engaged by respective switch arms $N_{31}$, $N_{32}$, $N_{33}$ ... $N_{3n}$. Contacts $M_{n1}$, $M_{n2}$ ... $M_{n(n-1)}$, $M_{nn}$ are connected to lead $L_n$ to be engaged by respective switch arms $N_{n1}$, $N_{n2}$ ... $N_{n(n-1)}$, $N_{nn}$. Switch arms $N_{11}$, $N_{21}$, $N_{31}$ ... $N_{n1}$ are connected to a lead $O_1$ which is connected to the first end terminal of a potentiometer $P_1$. Switch arms $N_{nn}$ ... $N_{12}$, $N_{22}$, $N_{32}$ are connected to a lead $O_2$ which is connected to the first end terminal of a potentiometer $P_2$. Switch arms $N_{3n}$, $N_{n(n-1)}$, $N_{13}$ ... $N_{23}$ are connected to a lead $O_3$ which is connected to the first end terminal of a potentiometer $P_3$. Switch arms $N_{2n}$, $N_{33}$, $N_{n2}$ ... $N_{1n}$ are connected to a lead $O_n$ which is connected to the first end terminal of a potentiometer $P_n$.

The contactors of potentiometers $P_1$, $P_2$, $P_3$ ... $P_n$ are connected to corresponding center terminals of respective double-throw, double-pole reversing switches $X_1$, $X_2$, $X_3$ ... $X_n$. The corresponding second center terminals of these switches are connected to ground. First end terminals $x_1$, $x_2$, $x_3$ ... $x_n$ are connected to first end terminals of respective isolated resistors $Y_1$, $Y_2$, $Y_3$ ... $Y_n$. The second end terminals of these isolating resistors are connected to one another and to the input terminal of a summing amplifier 25 which is described in detail hereinafter. Corresponding second end terminals $x_1'$, $x_2'$, $x_3'$ ... $x_n'$ of the reversing switches are connected to first end terminals of respective isolating resistors $Y_1'$, $Y_2'$, $Y_3'$ ... $Y_n'$. The second end terminals of this second group of isolating resistors are connected to one another and to the input terminal of a second summing amplifier 25' which is identical to summing amplifier 25. The output terminal of amplifier 25 is connected to the input terminal of amplifier 25' through a resistor 27. The output terminal of amplifier 25' is connected to the first input terminal of recorder 26.

Switch arms $S_1$, $N_{11}$, $N_{nn}$, $N_{3n}$, $N_{2n}$ are mechanically connected to one another and to a solenoid $Q_1$ so as to be actuated when the solenoid is energized. Switch arms $S_2$, $N_{21}$, $N_{12}$, $N_{n(n-1)}$, $N_{33}$ are mechanically connected to one another and to a solenoid $Q_2$ so as to be actuated when the solenoid is energized. Switch arms $S_3$, $N_{31}$, $N_{22}$, $N_{13}$, $N_{n2}$ are mechanically connected to one another and to a solenoid $Q_3$ so as to be actuated when the solenoid is energized. Switch arms $S_n$, $N_{n1}$, $N_{32}$, $N_{23}$, $N_{1n}$ are mechanically connected to one another and to a solenoid $Q_n$ so as to be actuated when the solenoid is energized. Solenoids $Q_1$, $Q_2$, $Q_3$ ... $Q_n$ are energized in sequence by a pulse timer 28 which is described in detail hereinafter.

In the operation of the apparatus of the present invention to transform seismic signals, it is necessary to determine the approximate wave form of the reflected signal to be identified. This can be accomplished either from theoretical considerations or by firing one or more preliminary shots in the area being investigated. Normally a location can be found where recorded traces at the seismometers are sufficiently free from external vibrations to enable the reflected wave form to be determined, at least to a close approximation. In making these preliminary shots the output signals from the seismometers are applied directly to conventional recording instruments.

For the purposes of discussion it will be assumed that the desired reflected wave pattern to be recognized is of the form illustrated in FIGURE 2a between time intervals $t_{15}$ and $t_{28}$. This wave is divided along the abscissa at as many equally spaced points (fourteen, for example) as multiplying units are provided in the apparatus of FIGURE 3. In this example, $n$ represents 14. The values of the ordinates of the curve of FIGURE 2a at each sequential time interval are set on a respective one of the P potentiometers in each of the units. Thus, at time $t_{28}$ the ordinate of the curve has a value of zero and at time $t_{27}$ the ordinate has a value of $+2$. These ordinate values are established on respective potentiometers $P_1$ and $P_2$ in the conventional manner for multiplication. For example, let it arbitrarily be assumed that the non-grounded end terminal of potentiometer $P_2$ is at $+5$ volts. In order to establish the value of $+2$ on this potentiometer, the contactor is positioned two-fifths the distance between the grounded end terminal and the non-grounded end terminal, assuming the potentiometer is linear. The voltage appearing at the contactor of potentiometer $P_2$ is thus $+2$ volts. If the voltage across potentiometer $P_2$ should increase to $+25$ volts, for example, the voltage at the contactor is increased by a factor of five to $+10$ volts. Switch $X_2$ is positioned so that terminal $x_2$ engages the contactor of potentiometer $P_2$.

The first ordinate value of the curve at time $t_{28}$ is set on the first unit by grounding the contactor of potentiometer $P_1$. The third ordinate value of zero volts at time $t_{26}$ is set on potentiometer $P_3$. If this value were negative switch $X_3$ would be positioned so that terminal $x_3'$ would engage the contactor of potentiometer $P_3$. This would accommodate a negative value.

Once the ordinate values of the curve illustrated in FIGURE 2a are set on the respective potentiometers as described, the mechanism is ready for operation. Seismometer 14 is positioned at the desired location and explosive charge 10 is detonated. Pulse timer 28 is energized so that solenoids $Q_1, Q_2, Q_3 \ldots Q_n$ are energized in sequence respectively. The frequency of timer 28 is such that the period between adjacent solenoids being energized is equal to one time interval represented in FIGURE 2a. For purposes of discussion it will be assumed that seismometer 14 provides an output signal of the form illustrated by the curve of FIGURE 2b. At time $t_0$ solenoid $Q_1$ is energized and a voltage corresponding to the zero ordinate of the curve of FIGURE 2b is applied through switch arm $S_1$ to capacitor $C_1$. This signal is also applied through amplifier $A_1$ and switch arm $N_{11}$ across potentiometer $P_1$. The signal applied across potentiometer $P_1$ is multiplied by the contactor setting of potentiometer $P_1$ and applied as the first input to summing amplifier 25. The multiplication of the zero output signal by the zero setting on potentiometer $P_1$ results in a zero output signal being applied to amplifier 25.

At time $t_1$ solenoid $Q_2$ is energized and a voltage corresponding to the second abscissa of the curve of FIGURE 2b is applied through switch arm $S_2$ to capacitor $C_2$. This signal is also applied through amplifier $A_2$ and switch arm $N_{21}$ across potentiometer $P_1$. At the same time the original signal stored on capacitor $C_1$ is applied through amplifier $A_1$ and switch arm $N_{12}$ across potentiometer $P_2$.

The zero voltage applied across potentiometer $P_2$ is multiplied by the +2 setting of that potentiometer to form an output voltage of zero which is applied to the input of summing amplifier 25 to form a portion of the second term in the output signal. The second increment of the incoming signal of +2 volts is multiplied by the zero setting of potentiometer $P_1$ to provide an output signal of zero volts which is applied through resistor $Y_1$ to the input of summing amplifier 25. This zero volts signal is added to the zero volt signal applied to summing amplifier 25 through resistors $Y_2$. It should thus be apparent that each increment of the incoming signal from seismometer 14 is successively applied to the capacitors and multiplying potentiometers of the circuit of FIGURE 3. The multiplied voltages are summed by amplifiers 25 and 25' and applied to recorder 26. This multiplication and summation process is illustrated mathematically in the following table.

TABLE I
Potentiometer Settings

| $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_n$ |
|---|---|---|---|---|---|---|---|---|---|---|---|---|---|
| 0 | 2 | 0 | −3 | −5 | −3 | 0 | 3 | 5 | 3 | 0 | −2 | 0 | 1 |

| Input signal | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_n$ | Output signal |
|---|---|---|---|---|---|---|---|---|---|---|---|---|---|---|---|
| 0 | 0 | | | | | | | | | | | | | | 0 |
| 2 | 2 | 0 | | | | | | | | | | | | | 0 |
| 2 | 2 | 2 | 0 | | | | | | | | | | | | 4 |
| 2 | 2 | 2 | 2 | 0 | | | | | | | | | | | 4 |
| 3 | 2 | 2 | 2 | 2 | 0 | | | | | | | | | | −2 |
| 3 | 3 | 2 | 2 | 2 | 2 | 0 | | | | | | | | | −10 |
| 2 | 3 | 3 | 2 | 2 | 2 | 2 | 0 | | | | | | | | −16 |
| 1 | 2 | 3 | 3 | 2 | 2 | 2 | 2 | 0 | | | | | | | −21 |
| 0 | 1 | 2 | 3 | 3 | 2 | 2 | 2 | 2 | 0 | | | | | | −22 |
| −1 | 0 | 1 | 2 | 3 | 3 | 2 | 2 | 2 | 2 | 0 | | | | | −14 |
| −1 | −1 | 0 | 1 | 2 | 3 | 3 | 2 | 2 | 2 | 2 | 0 | | | | −2 |
| −1 | −1 | −1 | 0 | 1 | 2 | 3 | 3 | 2 | 2 | 2 | 2 | 0 | | | 12 |
| −1 | −1 | −1 | −1 | 0 | 1 | 2 | 3 | 3 | 2 | 2 | 2 | 2 | 0 | | 25 |
| 1 | −1 | −1 | −1 | −1 | 0 | 1 | 2 | 3 | 3 | 2 | 2 | 2 | 2 | 0 | 33 |
| 2 | 1 | −1 | −1 | −1 | −1 | 0 | 1 | 2 | 3 | 3 | 2 | 2 | 2 | 2 | 32 |
| 3 | 2 | 1 | −1 | −1 | −1 | −1 | 0 | 1 | 2 | 3 | 3 | 2 | 2 | 2 | 22 |
| 3 | 3 | 2 | 1 | −1 | −1 | −1 | −1 | 0 | 1 | 2 | 3 | 3 | 2 | 2 | 7 |
| 4 | 3 | 3 | 2 | 1 | −1 | −1 | −1 | −1 | 0 | 1 | 2 | 3 | 3 | 2 | −11 |
| 5 | 4 | 3 | 3 | 2 | 1 | −1 | −1 | −1 | −1 | 0 | 1 | 2 | 3 | 3 | −26 |
| 4 | 5 | 4 | 3 | 3 | 2 | 1 | −1 | −1 | −1 | −1 | 0 | 1 | 2 | 3 | −31 |
| 3 | 4 | 5 | 4 | 3 | 3 | 2 | 1 | −1 | −1 | −1 | −1 | 0 | 1 | 2 | −25 |
| 1 | 3 | 4 | 5 | 4 | 3 | 3 | 2 | 1 | −1 | −1 | −1 | −1 | 0 | 1 | −18 |
| 0 | 1 | 3 | 4 | 5 | 4 | 3 | 3 | 2 | 1 | −1 | −1 | −1 | −1 | 0 | −15 |
| 0 | 0 | 1 | 3 | 4 | 5 | 4 | 3 | 3 | 2 | 1 | −1 | −1 | −1 | −1 | −16 |
| 1 | 0 | 0 | 1 | 3 | 4 | 5 | 4 | 3 | 3 | 2 | 1 | −1 | −1 | −1 | −14 |
| 2 | 1 | 0 | 0 | 1 | 3 | 4 | 5 | 4 | 3 | 3 | 2 | 1 | −1 | −1 | 1 |
| 3 | 2 | 1 | 0 | 0 | 1 | 3 | 4 | 5 | 4 | 3 | 3 | 2 | 1 | −1 | 27 |
| 3 | 3 | 2 | 1 | 0 | 0 | 1 | 3 | 4 | 5 | 4 | 3 | 3 | 2 | 1 | 46 |
| 2 | 3 | 3 | 2 | 1 | 0 | 0 | 1 | 3 | 4 | 5 | 4 | 3 | 3 | 2 | 44 |
| 2 | 2 | 3 | 3 | 2 | 1 | 0 | 0 | 1 | 3 | 4 | 5 | 4 | 3 | 3 | 20 |
| 2 | 2 | 2 | 3 | 3 | 2 | 1 | 0 | 0 | 1 | 3 | 4 | 5 | 4 | 3 | −11 |
| 2 | 2 | 2 | 2 | 3 | 3 | 2 | 1 | 0 | 0 | 1 | 3 | 4 | 5 | 4 | −27 |
| 2 | 2 | 2 | 2 | 2 | 3 | 3 | 2 | 1 | 0 | 0 | 1 | 3 | 4 | 5 | −24 |
| 1 | 2 | 2 | 2 | 2 | 2 | 3 | 3 | 2 | 1 | 0 | 0 | 1 | 3 | 4 | −8 |
| 1 | 1 | 2 | 2 | 2 | 2 | 2 | 3 | 3 | 2 | 1 | 0 | 0 | 1 | 3 | 7 |
| 1 | 1 | 1 | 2 | 2 | 2 | 2 | 2 | 3 | 3 | 2 | 1 | 0 | 0 | 1 | 11 |
| 1 | 1 | 1 | 1 | 2 | 2 | 2 | 2 | 2 | 3 | 3 | 2 | 1 | 0 | 0 | 8 |

Figure 2C:
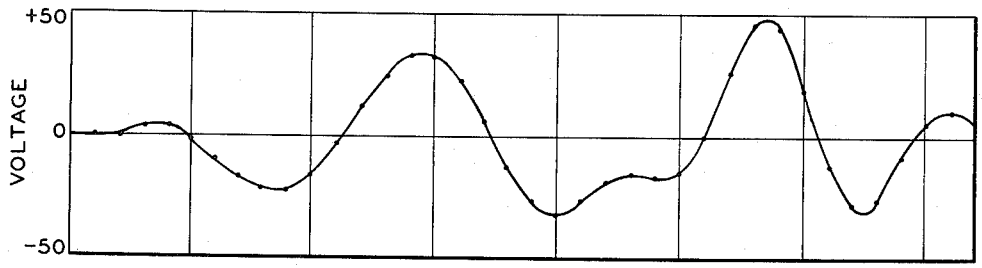
FIGURES 2c and 2d are graphical representations of transformed signals obtained in accordance with the present invention.

The numerical values in the top row of Table I represent the ordinate values of the curve of FIGURE 2a between times $t_{28}$ and $t_{15}$. The values in the left-hand vertical column represent the ordinate values of the curve of FIGURE 2b between the times zero and $t_{36}$. The values in the right-hand vertical column represent the summation of the product applied to the recorder 26. For any given horizontal row, the value in the right-hand summation column is obtained by multiplying each value in the horizontal row by the value appearing above that same row in the first horizontal column and summing the individual products. The values in the right-hand vertical column, proceeding downwardly, are applied sequentially to recorder 26. These values are plotted as a function of time in FIGURE 2c.

For purposes of description it will be assumed that the reflection curve illustrated in FIGURE 2b arrives at seismometer 13 at two time intervals prior to the arrival of the same curve at seismometer 14. Thus, the first output voltage of seismometer 13 is +2 as represented by time $t_2$ in FIGURE 2b. The output of seismometer 13 is applied to a multiplying circuit identical to that illustrated in FIGURE 3. The corresponding multiplication and summation process for the circuit associated with seismometer 13 is illustrated in the following table.

TABLE II

*Potentiometer Settings*

| Input signal | 0 | 2 | 0 | −3 | −5 | −3 | 0 | 3 | 5 | 3 | 0 | −2 | 0 | 1 | Output signal |
|---|---|---|---|---|---|---|---|---|---|---|---|---|---|---|---|
| 2 |   | 2 |   |   |   |   |   |   |   |   |   |   |   |   | 0 |
| 2 |   | 2 | 2 |   |   |   |   |   |   |   |   |   |   |   | 4 |
| 3 |   | 3 | 2 | 2 |   |   |   |   |   |   |   |   |   |   | 4 |
| 3 |   | 3 | 2 | 2 | 2 |   |   |   |   |   |   |   |   |   | 0 |
| 2 |   | 3 | 3 | 2 | 2 | 2 |   |   |   |   |   |   |   |   | −10 |
| 1 |   | 2 | 3 | 3 | 2 | 2 | 2 |   |   |   |   |   |   |   | −21 |
| 0 |   | 1 | 2 | 3 | 3 | 2 | 2 | 2 |   |   |   |   |   |   | −28 |
| −1 |   | 0 | 1 | 2 | 3 | 3 | 2 | 2 | 2 |   |   |   |   |   | −24 |
| −1 |   | −1 | 0 | 1 | 2 | 3 | 3 | 2 | 2 | 2 |   |   |   |   | −8 |
| −1 |   | −1 | −1 | 0 | 1 | 2 | 3 | 3 | 2 | 2 | 2 |   |   |   | 22 |
| −1 |   | −1 | −1 | −1 | 0 | 1 | 2 | 3 | 3 | 2 | 2 | 2 |   |   | 28 |
| 1 |   | −1 | −1 | −1 | −1 | 0 | 1 | 2 | 3 | 3 | 2 | 2 | 2 |   | 32 |
| 2 |   | 1 | −1 | −1 | −1 | −1 | 0 | 1 | 2 | 3 | 3 | 2 | 2 | 2 | 31 |
| 3 |   | 2 | 1 | −1 | −1 | −1 | −1 | 0 | 1 | 2 | 3 | 3 | 2 | 2 | 22 |
| 3 |   | 3 | 2 | 1 | −1 | −1 | −1 | −1 | 0 | 1 | 2 | 3 | 3 | 2 | 7 |
| 3 |   | 3 | 3 | 2 | 1 | −1 | −1 | −1 | −1 | 0 | 1 | 2 | 3 | 3 | −11 |
| 4 |   | 3 | 3 | 3 | 2 | 1 | −1 | −1 | −1 | −1 | 0 | 1 | 2 | 3 | −26 |
| 5 |   | 4 | 3 | 3 | 3 | 2 | 1 | −1 | −1 | −1 | −1 | 0 | 1 | 2 | −31 |
| 4 |   | 5 | 4 | 3 | 3 | 3 | 2 | 1 | −1 | −1 | −1 | −1 | 0 | 1 | −25 |
| 3 |   | 4 | 5 | 4 | 3 | 3 | 3 | 2 | 1 | −1 | −1 | −1 | −1 | 0 | −18 |
| 1 |   | 3 | 4 | 5 | 4 | 3 | 3 | 3 | 2 | 1 | −1 | −1 | −1 | −1 | −15 |
| 0 |   | 1 | 3 | 4 | 5 | 4 | 3 | 3 | 3 | 2 | 1 | −1 | −1 | −1 | −16 |
| 0 |   | 0 | 1 | 3 | 4 | 5 | 4 | 3 | 3 | 3 | 2 | 1 | −1 | −1 | −14 |
| 1 |   | 0 | 0 | 1 | 3 | 4 | 5 | 4 | 3 | 3 | 3 | 2 | 1 | −1 | 1 |
| 2 |   | 1 | 0 | 0 | 1 | 3 | 4 | 5 | 4 | 3 | 3 | 3 | 2 | 1 | 27 |
| 3 |   | 2 | 1 | 0 | 0 | 1 | 3 | 4 | 5 | 4 | 3 | 3 | 3 | 2 | 46 |
| 3 |   | 3 | 2 | 1 | 0 | 0 | 1 | 3 | 4 | 5 | 4 | 3 | 3 | 3 | 44 |
| 2 |   | 3 | 3 | 2 | 1 | 0 | 0 | 1 | 3 | 4 | 5 | 4 | 3 | 3 | 20 |
| 2 |   | 2 | 3 | 3 | 2 | 1 | 0 | 0 | 1 | 3 | 4 | 5 | 4 | 3 | −11 |
| 2 |   | 2 | 2 | 3 | 3 | 2 | 1 | 0 | 0 | 1 | 3 | 4 | 5 | 4 | −27 |
| 2 |   | 2 | 2 | 2 | 3 | 3 | 2 | 1 | 0 | 0 | 1 | 3 | 4 | 5 | −24 |
| 2 |   | 2 | 2 | 2 | 2 | 3 | 3 | 2 | 1 | 0 | 0 | 1 | 3 | 4 | −8 |
| 1 |   | 2 | 2 | 2 | 2 | 2 | 3 | 3 | 2 | 1 | 0 | 0 | 1 | 3 | 7 |
| 1 |   | 1 | 2 | 2 | 2 | 2 | 2 | 3 | 3 | 2 | 1 | 0 | 0 | 1 | 11 |
| 1 |   | 1 | 1 | 2 | 2 | 2 | 2 | 3 | 3 | 2 | 1 | 0 | 0 |   | 8 |

Figure 2D:
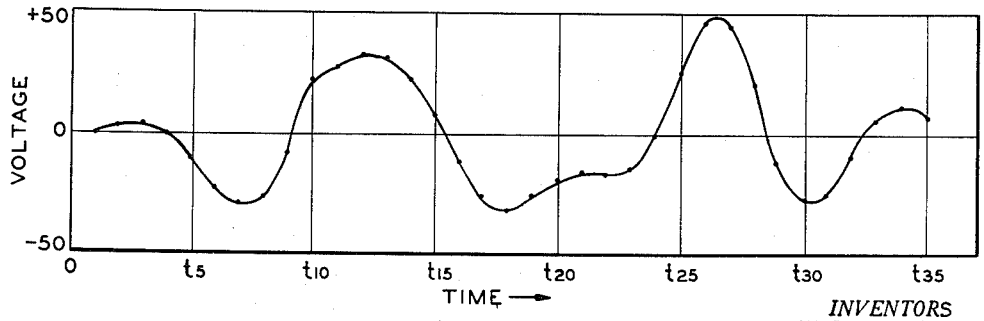

The values in the right-hand column of Table II represent the signal recorded by the output of the second summing circuit. This curve is illustrated in FIGURE 2d. From a comparison of the curves of FIGURES 2c and 2d it can be seen that a maximum peak occurs in FIGURE 2c between times $t_{28}$ and $t_{29}$. A corresponding maximum peak occurs in FIGURE 2d between the times $t_{26}$ and $t_{27}$. This difference in time between the two maximum position peaks represents the difference in time of arrival of the reflected wave pattern from bed 19 at seismometers 13 and 14. The operation thus performed by the apparatus of the invention is one of cross-correlation wherein the function set on the potentiometer is correlated with the corresponding function as it appears in the input signal. While the illustrated example has assumed a somewhat ideal wave form, it should be apparent that by dividing the desired wave pattern into a large number of segments a correlation of any desired accuracy can be made.

Figure 4:
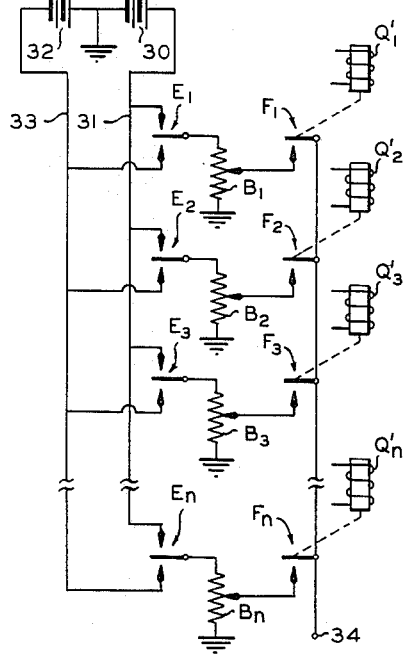
FIGURE 4 is a schematic circuit drawing of a signal generator.

It will be noted that the correlation operation herein described involves the multiplication of one signal by another. The signals are expressed in the forms of algebraic polynomials of the general form:

$$a_0 + a_1 X + a_2 X^2 + \ldots + a_n X^n$$

where the several $a$ coefficients represent the sequential amplitudes of the signal and the $X$'s denote the times of sampling. The $X$ can be thought of as a Fourier delay operator $e^{-iwh}$ where $w$ is two pi times the frequency and $h$ is the time interval between samples. Algebraically it behaves like the variable in a polynomial. Thus, the apparatus can be used to multiply two polynomials in the same manner as the seismometer output is multiplied by a predetermined function. The number of channels employed in the multiplication of polynomials is equal to two times the number of terms in the polynomial represented by the input signal minus one. A signal generator can be employed in place of the seismometer to provide an electrical signal representing one of the functions to be multiplied Such a signal generator is illustrated in FIGURE 4. The positive terminal of a voltage source 30 is connected to a lead 31, and the negative terminal of a voltage source 32 is connected to a lead 33. The negative terminal of voltage source 30 and the positive terminal of voltage source 32 are connected to ground. First end terminals of potentiometers $B_1$, $B_2$, $B_3$ ... $B_n$ are connected through respective switches $E_1$, $E_2$, $E_3$ ... $E_n$ selectively to leads 31 and 33. The second end terminals of potentiometers $B_1$, $B_2$, $B_3$ ... $B_n$ are connected to ground. The contactors of potentiometers $B_1$, $B_2$, $B_3$ ... $B_n$ are connected through respective switches $F_1$, $F_2$, $F_3$ ... $F_n$ to a terminal 34. Switches $F_1$, $F_2$, $F_3$ ... $F_n$ are closed when respective solenoids $Q_1'$, $Q_2'$, $Q_3'$ ... $Q_n'$ are energized.

If it is desired to multiply a first polynominal of the form $$a_0 + a_1 x + a_2 x^2 + \ldots + a_n x^n$$

by a second polynominal of the form $$b_0 + b_1 x + b_2 x^2 + \ldots + b_n x^n$$

the values of $a_0$, $a_1$, $a_2$ ... $a_n$ are set on respective potentiometers $B_1$, $B_2$, $B_3$ ... $B_n$ and the values of $b_0$, $b_1$, $b_2$ ... $b_n$ are set on respective potentiometers $P_1$, $P_2$, $P_3$ ... $P_n$ of FIGURE 3. In this application the contactors of potentiometers $B_1$, $B_2$, $B_3$ ... $B_n$ are connected to respective leads $L_1$, $L_2$, $L_3$ ... $L_n$ of FIGURE 3, thereby eliminating switches $F_1$, $F_2$, $F_3$ ... $F_n$ of FIGURE 4 and the input capacitors and amplifiers of FIGURE 3. The contactors of potentiometers $B_1$, $B_2$, $B_3$ ... $B_n$ can be connected to the input terminals of respective amplifiers $A_1$, $A_2$, $A_3$ ... $A_n$ to isolate the potentiometers. The apparatus operates as previously described. The signs of $a_0$, $a_1$, $a_2$ ... $a_n$ are set by respective switches $E_1$, $E_2$, $E_3$ ... $E_n$ engaging either positive lead 31 or negative lead 33.

Switches $F_1$, $F_2$, $F_3$ ... $F_n$ of FIGURE 4 permit the apparatus to be operated as a function generator. If solenoids $Q_1'$, $Q_2'$, $Q_3'$ ... $Q_n'$ are energized in sequence, the voltage at terminal 34 has sequential values representative of the potentials at the contactors of respective potentiometers $B_1$, $B_2$, $B_3$ ... $B_n$. If desired, terminal 34 can be connected to terminal 21 of FIGURE 3. Solenoids $Q_1'$, $Q_2'$, $Q_3'$ ... $Q_n'$ can be synchronized with solenoids $Q_1$, $Q_2$, $Q_3$ ... $Q_n$ or operated at different speeds.

Figure 6:
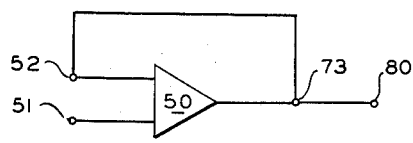
FIGURE 6 illustrates the manner in which amplifiers of FIGURE 5 are connected in the circuit of FIGURE 3.
Figure 5:
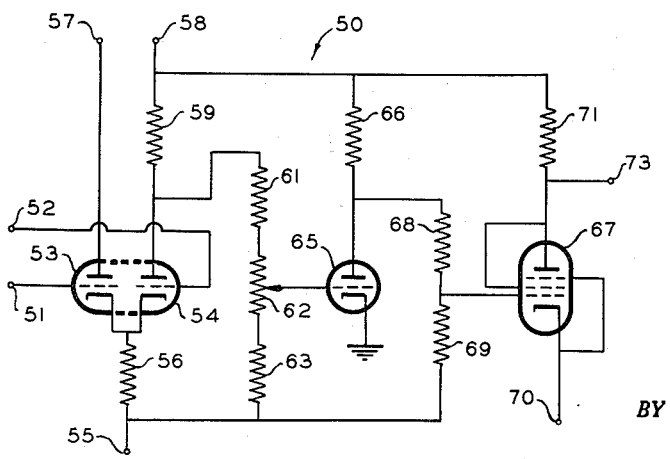
FIGURE 5 is a schematic circuit diagram of an amplifier employed in FIGURE 3.
Figure 3:
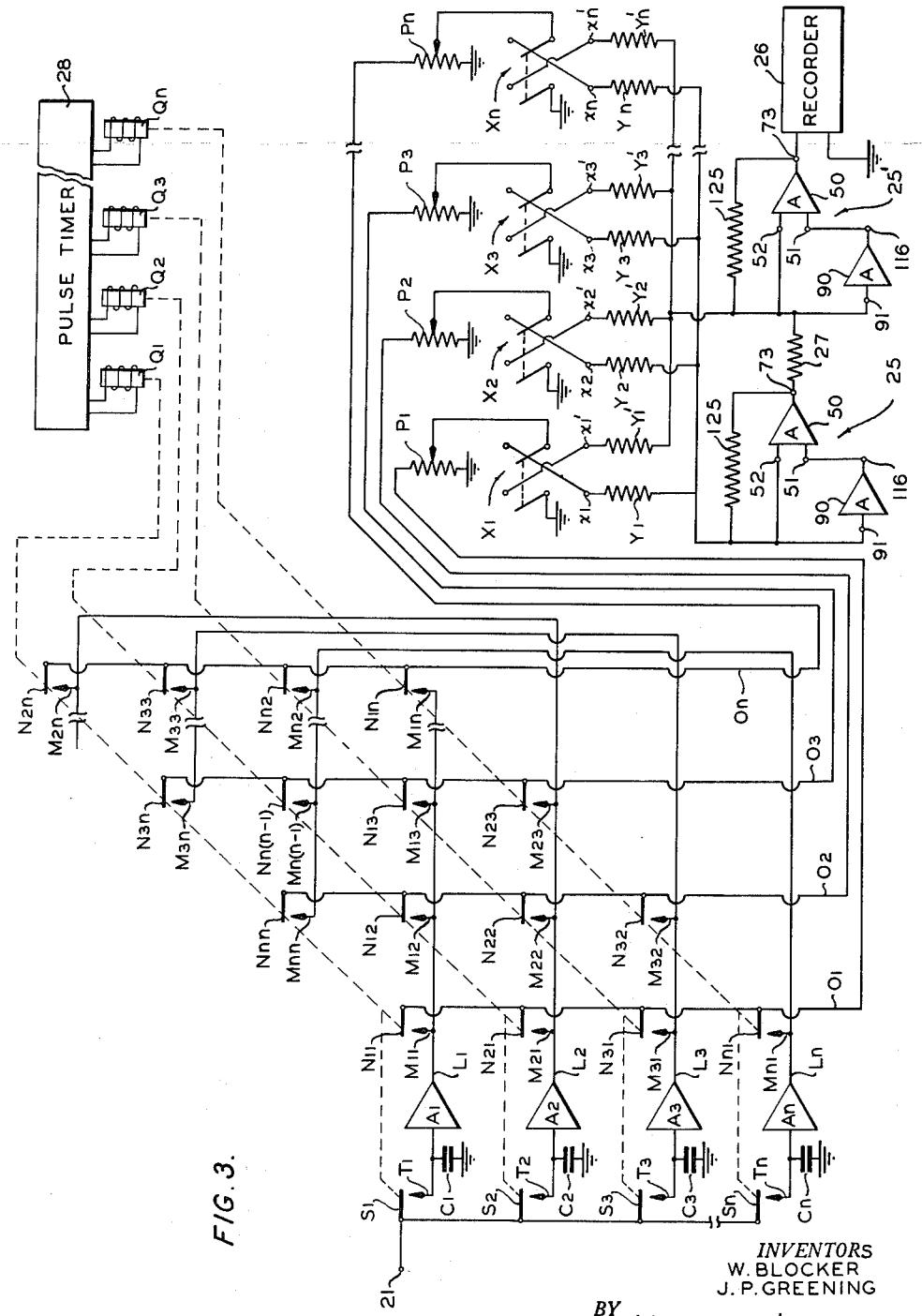
FIGURE 3 is a schematic circuit diagram of a first embodiment of the signal multiplying apparatus of this invention.

In FIGURE 5 there is shown an amplifier which can be employed as the isolating amplifiers in FIGURE 3. These amplifiers are used to decrease the leakage from the capacitors. The isolating amplifiers of FIGURE 3 are characterized by a high impedance input and a low impedance output. The amplifier 50 of FIGURE 5 is provided with first and second input terminals 51 and 52 which are connected to the respective control grids of triodes 53 and 54. The cathodes of triodes 53 and 54 are connected to one another and to a negative potential terminal 55 through a common resistor 56. The anode of triode 53 is connected to a positive potential terminal 57. The anode of triode 54 is connected to a positive potential terminal 58 through a resistor 59. The anode of triode 54 is also connected to terminal 55 through a resistor 61, a potentiometer 62 and a resistor 63, these elements being connected in series relation. The contactor of potentiometer 62 is connected to the control grid of a third triode 65. The cathode of triode 65 is connected to ground. The anode of triode 65 is connected to terminal 58 through a resistor 66. The anode of triode 65 is also connected to the control grid of a pentode 67 through a resistor 68. The control grid of pentode 67 is connected to terminal 55 through a resistor 69. The cathode and suppressor grid of pentode 67 are connected to one another and to a negative potential terminal 70. The screen grid and anode of pentode 67 are connected to one another and to terminal 58 through a resistor 71. The anode of pentode 67 is also connected to an output terminal 73. When used in FIGURE 3, terminal 73 is connected directly to terminal 52, as shown in FIGURE 6. Terminal 80 becomes the output terminal.

As previously mentioned, amplifier 50, when connected as shown in FIGURE 6 with terminal 51 as the input, has a high impedance input and a low impedance output. Representative values of the circuit components of this amplifier are as follows: resistor 56, 70,000 ohms; resistor 59, 1 megohm; resistor 61, 750,000 ohms; potentiometer 62, 500,000 ohms; resistor 63, 3.75 megohms; resistor 66, 250,000 ohms; resistor 68, 4 megohms; resistor 69, 2 megohms; resistor 71, 100,000 ohms; triodes 53 and 54, each one-half of a tube 12AX7; triode 65, a 6AQ6 tube; pentode 67, a 6AG5 tube; terminal 55 is maintained at —200 volts; terminal 70 is maintained at —100 volts; terminal 57 is maintained at 200 volts; and terminal 58 is maintained at 300 volts.

Figure 7:
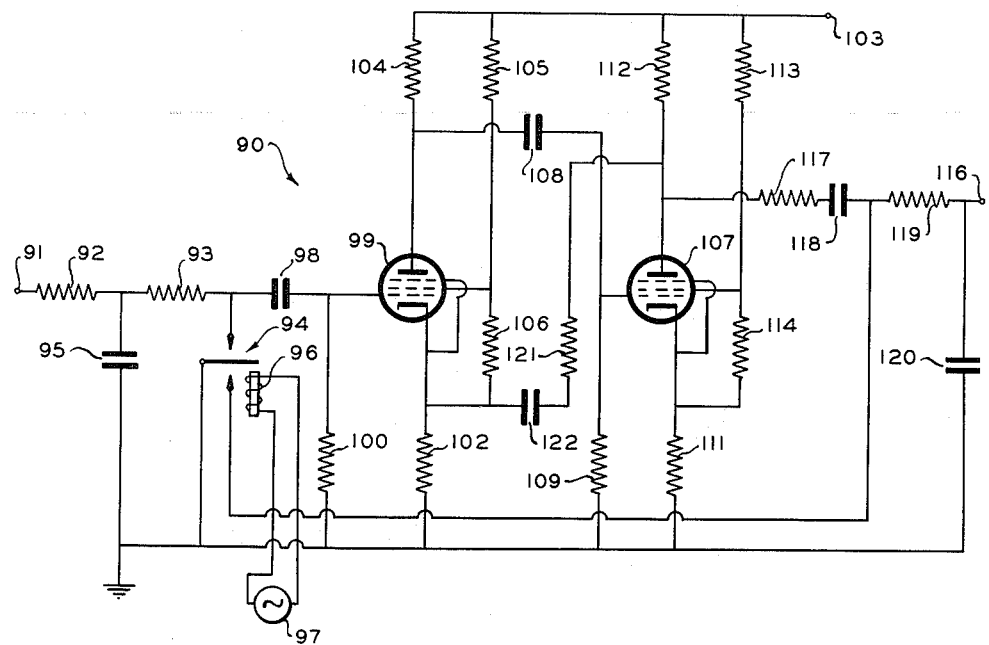
FIGURE 7 is a schematic representation of a portion of the summing amplifier of FIGURE 3.

Summing amplifiers 25 and 25' of FIGURE 3 include amplifiers 90 which can be of the form illustrated in FIGURE 7. The input terminal 91 of amplifier 90 is connected through a pair of series connected resistors 92 and 93 to one fixed contact of a synchronous chopper 94. The junction between resistors 92 and 93 is connected to ground through a capacitor 95. The movable arm of chopper 94 is connected to ground. Chopper 94 is energized by a coil 96, which is connected to a source of alternating current 97, so that the movable arm engages the two fixed contacts periodically at the frequency of current source 97. The first fixed contact of chopper 94 is connected through a capacitor 98 to the control grid of a pentode 99. The control grid of pentode 99 is connected to ground through a resistor 100. A direct potential applied to input terminal 91 thus results in the application of an alternating potential to the control grid of pentode 99.

The cathode of pentode 99 is connected to ground through a resistor 102. The anode of pentode 99 is connected to a positive potential terminal 103 through a resistor 104. The screen grid of pentode 99 is connected to terminal 103 through a resistor 105 and to the cathode of pentode 99 through a resistor 106. The suppressor grid of pentode 99 is internally connected to its cathode. The anode of pentode 99 is connected to the control grid of a second pentode 107 through a capacitor 108. The control grid of pentode 107 is connected to ground through a resistor 109. The cathode of pentode 107 is connected to ground through a resistor 111, and is also connected internally to the suppressor grid of pentode 107. The anode of pentode 107 is connected to terminal 103 through a resistor 112. The anode of pentode 107 is also connected to the cathode of pentode 99 through resistor 121 and capacitor 122. The screen grid of pentode 107 is connected to terminal 103 through a resistor 113 and to the cathode of pentode 107 through a resistor 114. The anode of pentode 107 is connected to an output terminal 116 through a resistor 117, a capacitor 118 and a resistor 119, these elements being connected in series relation. The junction between capacitor 118 and resistor 119 is connected to the second fixed contact of chopper 94. A capacitor 120 is connected between output terminal 116 and ground.

An input signal applied to terminal 91 of amplifier 90 is applied to the control grid of pentode 99 during alternate half cycles of signal applied to chopper 94. During the alternate half cycles, the control grid of pentode 99 is connected to ground through capacitor 98. This results in an alternating signal being applied to the input of pentode 99. This signal is amplified by pentodes 99 and 107 and applied to the output terminal 116. The junction between capacitor 118 and resistor 119 is, however, connected to ground during alternate half cycles of the operation of chopper 94. This provides a rectifier in the output circuit of the amplifier. Resistor 119 and capacitor 120 serve to filter the rectified output signal so that a steady D.C. voltage appears between output terminal 116 and ground. Representatives values of the circuit components of amplifier 90 are as follows: resistor 92, 240,000 ohms; resistors 93, 100 and 109, 2 megohms each; resistors 104 and 112, 390,000 ohms each; resistors 105 and 113, 100,000 ohms each; resistors 106 and 114, 24,000 ohms each; resistor 121, 1.2 megohms; resistors 102 and 111, 1,000 ohms each; resistor 117, 1 megohm; resistor 119, 5.1 megohms; capacitors 98 and 118, 0.05 microfarad; capacitors 95 and 122, 0.1 microfarad; capacitor 108, 0.005 microfarad; capacitor 120, 5 microfarad; pentodes 99 and 107, each 6AK5 tubes; and potential terminal 103 is maintained at 200 volts.

Summing amplifier 25' of FIGURE 3 comprises both an amplifier 90 and an isolating amplifier 50. The common junction of the second terminals of isolating resistors $Y_1'$, $K_2'$, $Y_3' \ldots Y_n'$ is connected to input terminal 91 of amplifier 90 and to the input terminal 52 of an amplifier 50. Output terminal 116 of amplifier 90 is connected directly to input terminal 51 of amplifier 50. A feedback resistor 125 is connected between terminals 73 and 52 of amplifier 50. Output terminal 73 is connected to the first input terminal of recorder 26. The second input terminal of recorder 26 is connected to ground. The voltage amplified by amplifier 90 is substantially drift-free. This drift-free voltage is applied to input terminal 51 of amplifier 50. The voltages to be summed are applied to input terminal 52. The drift-free reference voltage applied to terminal 51 reduces the drift of amplifier 50 to provide stable D.C. summing. The positive terms are summed by an identical summing circuit 25, the output of which is applied to summing circuit 25'.

Figure 8:
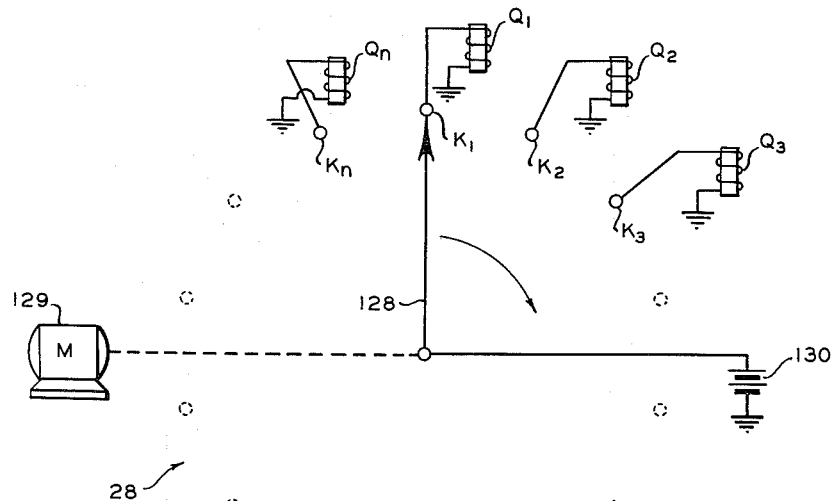
FIGURE 8 is a schematic representation of a pulse timer.

A suitable pulse timer 28 is shown in FIGURE 8. First terminals of solenoids $Q_1, Q_2, Q_3 \ldots Q_n$ are connected to respective contacts $K_1, K_2, K_3 \ldots K_n$ which are arranged in a circular path. A switch arm 128 is rotated by a motor 129 to engage contacts $K_1, K_2, K_3 \ldots K_n$ in sequence. Arm 128 is connected to one terminal of a current source 130, the second terminal of which is grounded, as are the second terminals of solenoids $Q_1, Q_2, Q_3 \ldots Q_n$. Solenoids $Q_1, Q_2, Q_3 \ldots Q_n$ are thus energized in sequence by rotation of switch arm 128.

While the invention has been described in conjunction with present preferred embodiments, it should be apparent that it is not limited thereto.

What is claimed is:

1. Apparatus for multiplying two algebraic polynomials which comprises means adapted to receive a first electrical signal which varies in accordance with the coefficients of one of the polynomials to be multiplied, a plurality of electrical signal storage means, a plurality of first switches to apply said first signal selectively to said storage means, a plurality of electrical signal multiplying means, a plurality of second switches to connect the inputs of said multiplying means selectively to said storage means, said multiplying means being set to multiply input signals applied thereto by respective coefficients of the second of the polynomials to be multiplied, means to actuate said first and second switches sequentialy so that said first signal is applied to said storage means sequentially and each of said multiplying means is connected at the same time to a different one of said storage means so that the portion of said first signal stored on each said storage means is applied in sequence to each of said multiplying means, and means to sum the outputs of said multiplying means.

2. The combination in accordance with claim 1 wherein each of said storage means comprises a capacitor.

3. The combination in accordance with claim 1 wherein each of said storage means comprises a potentiometer.

4. The combination in accordance with claim 1 wherein each of said multiplying means comprises a potentiometer.

5. The combination in accordance with claim 1 wherein said means to sum comprises means associated with each of said multiplying means to provide a first output signal if the term set on the corresponding multiplying means is positive and a second output signal if the term set on the corresponding multiplying means is negative, means to sum said first and second output signals separately, and means to sum said summed signals.

6. The combination in accordance with claim 1 wherein said means to actuate said first and second switches comprises a plurality of solenoids, and means to energize said solenoids in sequence.

7. The combination in accordance with claim 6 wherein said means to energize comprises a plurality of spaced contacts, the first terminals of said solenoids being connected to respective ones of said contacts, a voltage source, a switch arm connected to one terminal of said voltage source, the second terminal of said voltage source being connected to the second terminals of said solenoids, and means to move said switch arm to engage said contacts sequentially.

8. Apparatus for multiplying two algebraic polynomials which comprises means adapted to receive a first electrical signal which varies in accordance with the coefficients of one of the polynomials to be multiplied, a plurality of electrical signal storage means, a plurality of isolation amplifiers having the input terminals thereof connected across respective ones of said storage means, a plurality of first switches to apply said first signal selectively to said storage means, a plurality of electrical signal multiplying means, a plurality of second switches to connect the inputs of said multiplying means selectively to the outputs of said isolation amplifiers, said multiplying means being set to multiply input signals applied thereto by respective coefficients of the second of the polynomials to be multiplied, means to actuate said first and second switches sequentially so that said first signal is applied to said storage means sequentially and each of said multiplying means is connected at the same time to a different one of said isolation amplifiers so that the portion of said first signal stored on said storage means is applied in sequence to each of said multiplying means and means to sum the outputs of said multiplying means.

9. The combination in accordance with claim 8 wherein said storage means comprise capacitors and said multiplying means comprise potentiometers.

10. Apparatus for multiplying two algebraic polynomials which comprises means adapted to receive a first electrical signal which varies in accordance with the coefficients of one of the polynomials to be multiplied, a plurality of electrical signal storage means, a plurality of first solenoid operated switches to apply said first signal selectively to said storage means, a plurality of electrical signal multiplying means, a plurality of second solenoid operated switches to connect the inputs of each of said multiplying means selectively to each of said storage means, said multiplying means being set to multiply input signals applied thereto by respective coefficients of the second of the polynomials to be multiplied, means to actuate selected ones of said first and second solenoid operated switches sequentially so that said first signal is applied to said storage means sequentially and each of said multiplying means is connected at the same time to a different one of said storage means so that the portion of said first signal stored on each said storage means is applied in sequence to each of said multiplying means, and means to sum the outputs of said multiplying means.

11. Apparatus for multiplying two algebraic polynomials which comprises means adapted to receive a first electrical signal which varies in accordance with the coefficients of one of the polynomials to be multiplied, a plurality of electrical signal storage means, a plurality of first solenoid-operated switches to apply said first signal selectively to said storage means, a plurality of electrical signal multiplying means, a plurality of second solenoid operated switches to connect the inputs of each of said multiplying means selectively to individual ones of said storage means, said multiplying means being set to multiply input signals applied thereto by respective coefficients of the second of the polynomials to be multiplied, means to actuate in unison selected ones of said first and second solenoid operated switches in sequence so that said first signal is applied to said storage means in sequence and each of said multiplying means is connected at the same time to the one of said storage means receiving said first signal and including a plurality of solenoids each disposed to operate one of said first solenoid operated switches and at least one of said second solenoid operated switches, a plurality of spaced contacts each one of which is connected to a terminal of one of said solenoids, a switch arm, means for connecting a voltage source between said switch arm and said contacts, and means to move said switch arm into engagement with said contacts in sequence.

12. Apparatus for multiplying two algebraic polynomials which comprises means adapted to receive a first electrical signal which varies in accordance with the coefficients of one of the polynomials to be multiplied, a plurality of electrical signal storage means, a plurality of first solenoid operated switches to apply said first signal selectively to said storage means, a plurality of electrical signal multiplying means, a switch array including a plurality of solenoid operated switch means connected to each of said multiplying means and disposed for connecting individual ones of said multiplying means seriatum in sequence to each of said storage means and for at the same time connecting selected others of said multiplying means to others of said storage means, means to actuate said solenoid operated switch means, and means to sum the outputs of said multiplying means.

References Cited in the file of this patent

UNITED STATES PATENTS

| | | |
|---|---|---|
| 2,306,458 | Mayne | Dec. 29, 1942 |
| 2,519,615 | Wannamaker | Aug. 22, 1950 |
| 2,638,268 | Redheffer | May 12, 1953 |
| 2,794,965 | Yost | June 4, 1957 |
| 2,855,147 | Greening | Oct. 7, 1958 |

OTHER REFERENCES

Journal of the Franklin Inst. (Tomovich), pages 145–147, August 1952.

Royall Aircraft Est. Tech. Note No. GW225 (Stoneman), 18 pages, December 1952.

Soroka: "Analog Methods in Computation and Simulation," published by McGraw-Hill, New York, 1954, page 92 relied upon.